J. C. MULLINS, Jr.
THRUST BEARING FOR FORD MOTOR SHAFTS.
APPLICATION FILED SEPT. 24, 1919. RENEWED JAN. 21, 1921.
1,393,305.
Patented Oct. 11, 1921.
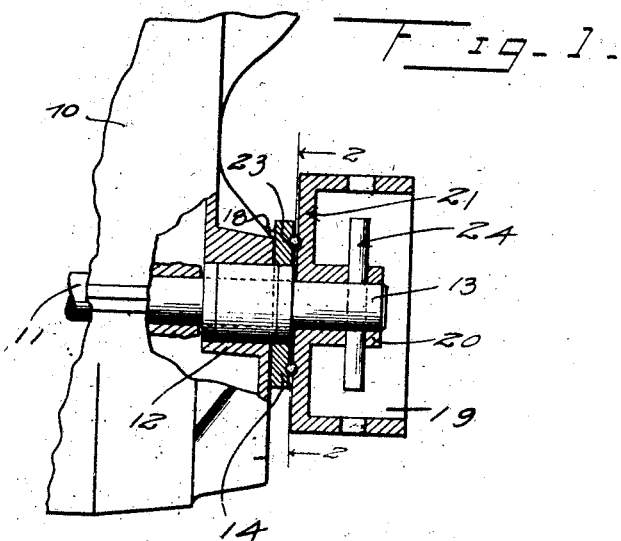
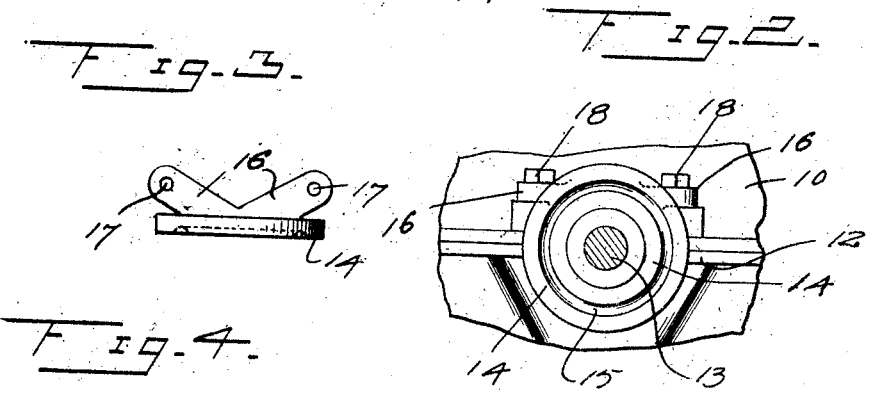
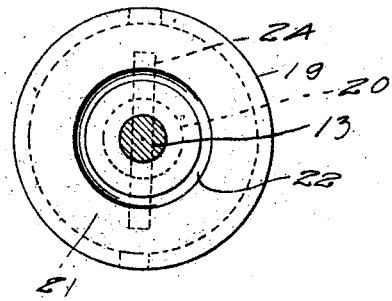
Inventor
J. C. Mullins, Jr.
By Thomas N. Harner
Attorney

UNITED STATES PATENT OFFICE.

JOHN C. MULLINS, JR., OF COEBURN, VIRGINIA, ASSIGNOR OF ONE-HALF TO CHARLES O. RAMSEY, OF COEBURN, VIRGINIA, AND ONE-FOURTH TO ISAAC N. KELLEY, OF BIG STONE GAP, VIRGINIA.

THRUST-BEARING FOR FORD MOTOR-SHAFTS.

1,393,305.     Specification of Letters Patent.     Patented Oct. 11, 1921.

Application filed September 24, 1919, Serial No. 325,918. Renewed January 21, 1921. Serial No. 439,051.

*To all whom it may concern:*

Be it known that I, JOHN C. MULLINS, Jr., a citizen of the United States, and a resident of Coeburn, in the county of Wise, and State of Virginia, have invented certain new and useful Improvements in Thrust-Bearings of Ford Motor-Shafts, of which the following is a specification.

My present invention relates generally to thrust bearings and more particularly to a thrust bearing for the motor shaft of Ford automobiles, in connection with which it is a well known fact that considerable trouble is now experienced, due to endwise movement of the motor shaft from wear, permitting the contact points of the magneto, a portion of which rotates with the fly wheel secured on the motor shaft, to become improperly spaced, and the object of my present improvements is the provision of a simple, inexpensive arrangement which may be readily installed and which will operate effectively and efficiently to avoid these disadvantages.

In completing my invention, I propose the use of an arrangement, involving simply the addition of a bearing plate which may be installed and effectively secured to the timing gear housing of a Ford motor and the substitution of a lower fan belt pulley for the one usually employed, the nature of which will admit of its coöperation with, and allowance for the above mentioned bearing plate and the bearings disposed between this plate and the inner wall of the pulley.

With the above general statement, it is believed the invention may be thoroughly understood and readily appreciated from the following description thereof and the accompanying drawing which forms a part of this specification and in which, Figure 1 is a side view partly in elevation and partly broken away and in section of the forward portion of the timing gear housing, illustrating the motor shaft provided with my improvements, Fig. 2 is a vertical transverse section taken substantially on line 2—2 of Fig. 1, Fig. 3 is a bottom plan view of the bearing plate, and Fig. 4 is an elevation looking at the inner face of my improved lower fan belt pulley.

Referring now to these figures, I have generally indicated at 10 in Figs. 1 and 2, the timing gear housing of a Ford motor through which the forward portion of the motor or crank shaft 11 usually has bearing at 12, its forward portion projecting forwardly beyond the timing gear housing to receive the lower fan belt pulley, the connecting pin of which serves to coöperate with the usual starting crank.

In accordance with my invention, I contemplate the removal of the usual lower fan belt pulley and the disposition upon the forwardly projecting end 13 of the motor shaft of a bearing plate 14, preferably of circular form, having an annular groove 15 in one face, as best seen in Fig. 2 and provided with angular extending wings 16 projecting from its opposite face and apertured as at 17 so as to register with the adjacent bolt receiving apertures of the upper and lower sections of the timing gear housing, as seen in Fig. 2, in order to receive the bolts 18 and thus rigidly secure the bearing plate 14 against the front face of the timing gear housing and around the shaft 11.

I further contemplate the substitution of a lower fan belt pulley 19 in place of the usual one, the hub portion 20 of which is bored to receive the shaft end 13 and is integral with a wall 21 at the inner side of the pulley, whose outer face opposes the outer face of the bearing plate 14 and has an annular groove 22, as seen particularly in Fig. 4, which is complementary to the annular groove 15 of the bearing plate, whereby to form a ball race for the reception of anti-friction balls 23. The hub portion 20 of this pulley has diametrically opposed openings so arranged as to receive the usual connecting pin 24 which passes also through the shaft end 13, these openings of the hub 20 being so arranged as to allow for the space required by the bearing plate 14.

In this way, it is obvious that my invention provides for an effective, efficient thrust bearing which will avoid the disadvantages of endwise movement of the motor shaft 11, due to the wear of the parts, as well as one which may be readily and quickly installed, and will be a great benefit to the general operation of the motor in connection with which it is utilized.

I claim:—

1. The combination with the timing gear housing and motor shaft of a Ford motor, the former of which has a series of connecting bolts and the forward end of which motor shaft projects slightly beyond the timing gear housing, of a bearing plate disposed on the shaft and secured to the timing gear housing by means of the said bolts of the latter, a lower fan belt pulley secured upon the projecting end of the shaft and having its inner wall opposing said bearing plate, and anti-friction members between the said pulley wall and the bearing plate, as and for the purpose described.

2. The combination with the timing gear housing in bolted upper and lower sections and the motor shaft whose forward end projects slightly beyond the timing gear housing, of a bearing plate disposed on the shaft, and against the timing gear housing, having apertured extensions, the apertures of which are arranged to register with and receive certain of the bolts of the timing gear housing, said plate having an annular groove in its outer face and a pulley secured upon the projecting portion of the shaft, having a wall at its inner side provided with an annular groove facing, and coöperating with the groove of the bearing plate, and anti-friction members disposed in the grooves, as described.

In testimony whereof I affix my signature.

JOHN C. MULLINS, Jr.